May 4, 1965  Z. TAKATS ETAL  3,181,444
CONTROL AND ACTUATION OF RAPID PROCESSING EQUIPMENT
Filed Aug. 27, 1962  3 Sheets-Sheet 1

INVENTORS
ZOLTAN TAKATS
JOHN KOMAS
BY

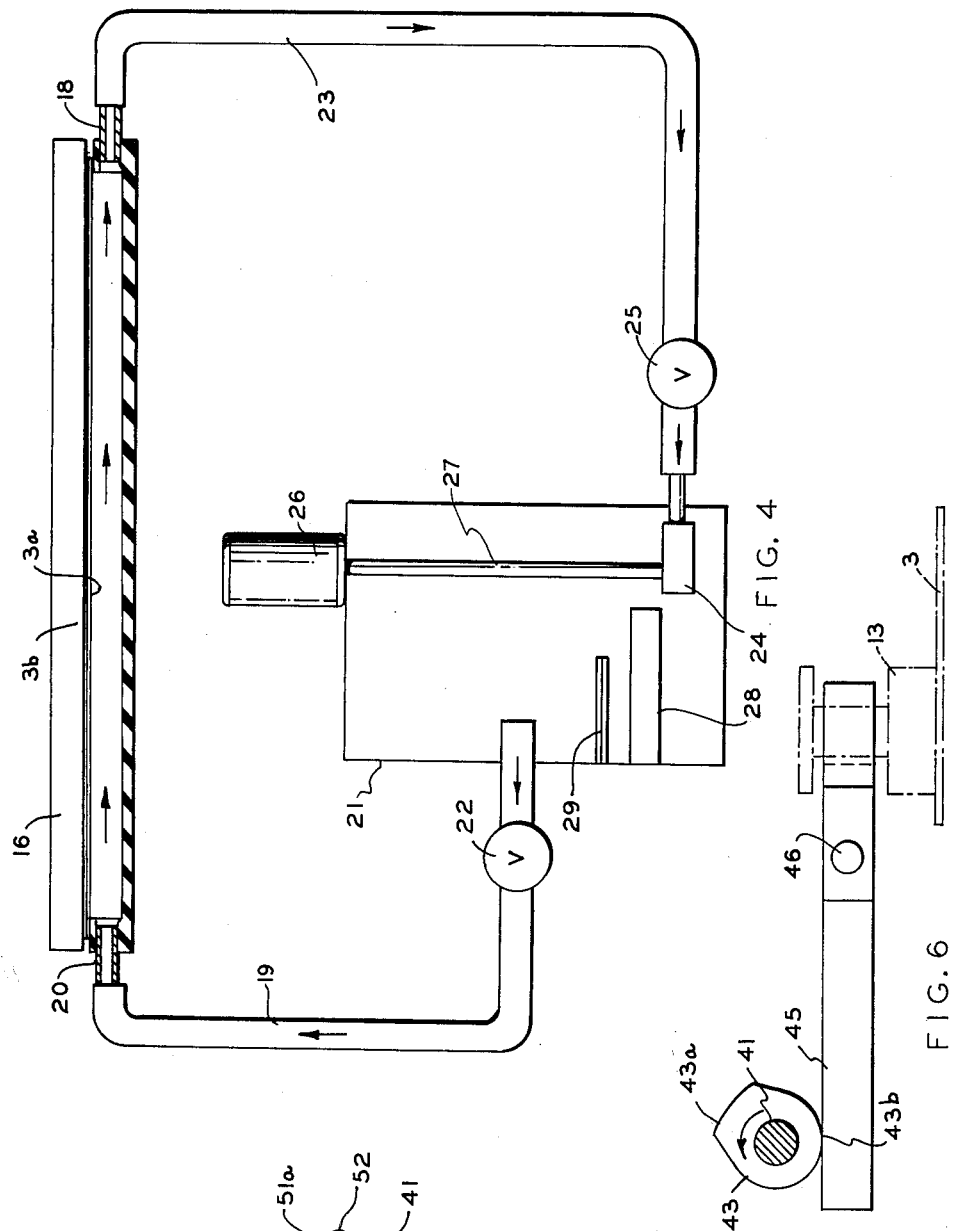

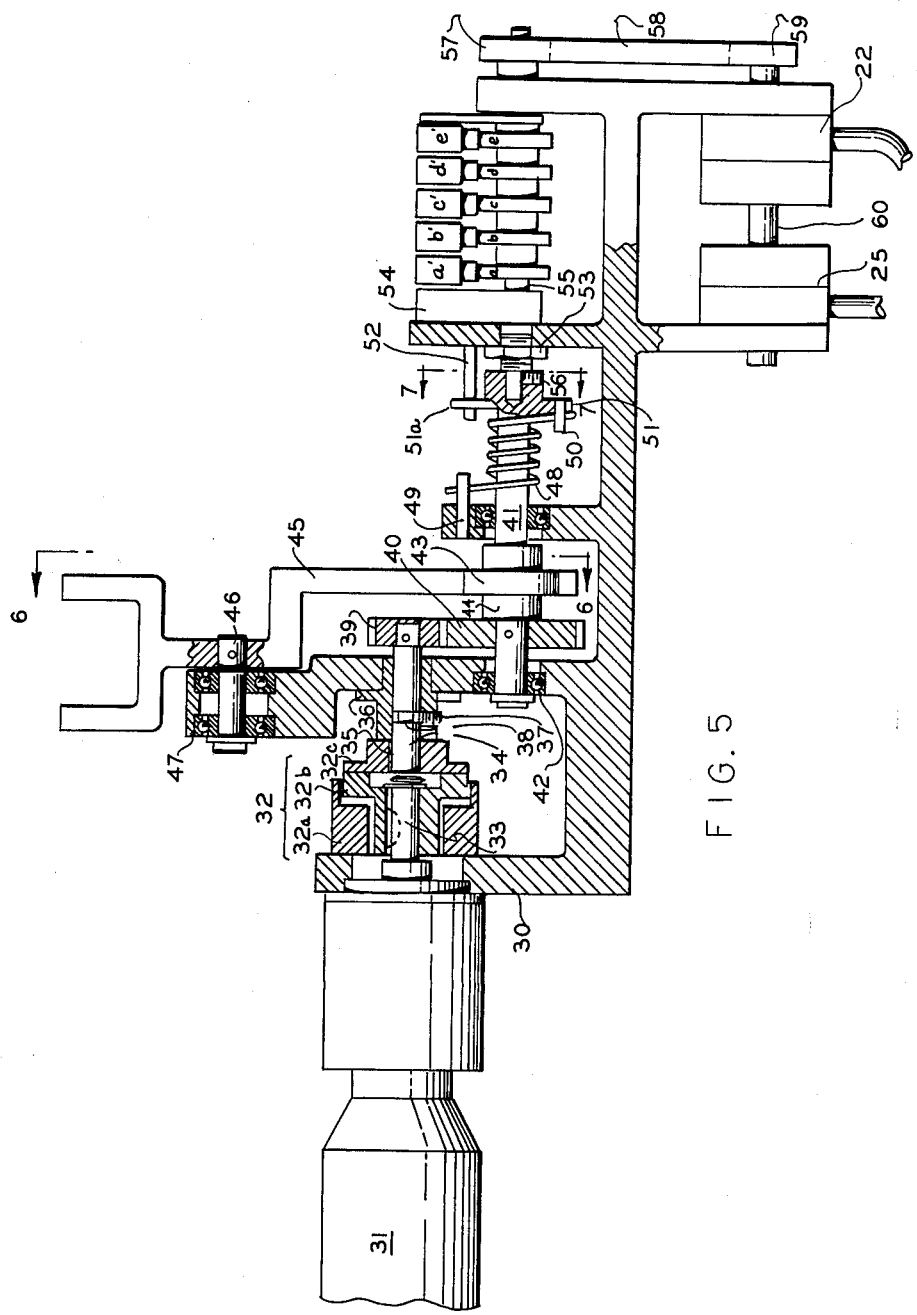

United States Patent Office 3,181,444
Patented May 4, 1965

3,181,444
CONTROL AND ACTUATION OF RAPID
PROCESSING EQUIPMENT
Zoltan Takats, Vestal, and John Komas, Binghamton,
N.Y., assignors to General Aniline & Film Corporation,
New York, N.Y., a corporation of Delaware
Filed Aug. 27, 1962, Ser. No. 219,487
7 Claims. (Cl. 95—12)

This invention relates to an apparatus for the rapid processing of photographic film to permit viewing thereof within a relatively short time after exposure and relates more particularly to airborne equipment for the recording and prompt viewing of images; for example, of the type appearing on a cathode ray tube. Specifically, the instant invention is directed to a complete, automatic control and actuating mechanism for the rapid processing facilities forming part of such apparatus.

Photographic systems for expeditious film viewing are generally carried out in a light-tight film magazine. In such systems, the film is fed from a supply spool past an exposure station at which point it receives an image from a camera body. The exposed film is then passed through a rapid processing station to a viewing panel where it is subject to examination by an operator.

The most important factor in determining the speed with which exposed film may be reviewed is the rapidity and reliability of the processing system. Manual operation of the rapid processing equipment for airborne use is an involved and tedious procedure, normally requiring the full-time services of the operator. It is also subject to malfunctioning due to operator error. Automatic processing equipment used in the past has been unduly complex and subject to numerous mechanical breakdowns, causing the destruction of important exposures and the loss of significant amounts of time.

An important object of this invention is to provide a fully automated, rapid processing means which is free from the foregoing and other disadvantages.

Another object of this invention is the provision of apparatus of the type described having maximum reliability and minimum operator participation.

The instant invention contemplates the use of a sequencing unit which is capable of automatically rendering the rapid processing equipment ready for operation, putting the equipment into operation, and shutting down the equipment after completion of a run. The film to be processed will generally be moving continuously, but may be stopped and started at will, with automatic stopping and starting of the rapid processing equipment.

An important feature of the invention is the provision of means for automatically returning the rapid processing facilities to a predetermined starting point in the event of a failure in the electrical power.

Other objects and advantages of this invention, together with certain details of construction and combinations of parts, will appear from the following detailed description and will be particularly pointed out in the appended claims.

In the drawings, wherein preferred embodiments of this invention are shown:

FIG. 4 is a cross-sectional view on line 4—4 in FIG. 2 in the direction of the arrows, showing the developer solution circulating means;

FIG. 5 is an enlarged detail, partly in section, of a preferred embodiment of the sequencing unit employed in the apparatus of the instant invention;

FIG. 6 is a cross-sectional view on line 6—6 in FIG. 5 in the direction of the arrows; and FIG. 7 is a cross-sectional view on line 7—7 in FIG. 5 in the direction of the arrows.

Identical reference numerals indicate like parts throughout the several views of the drawings.

Figure 1:
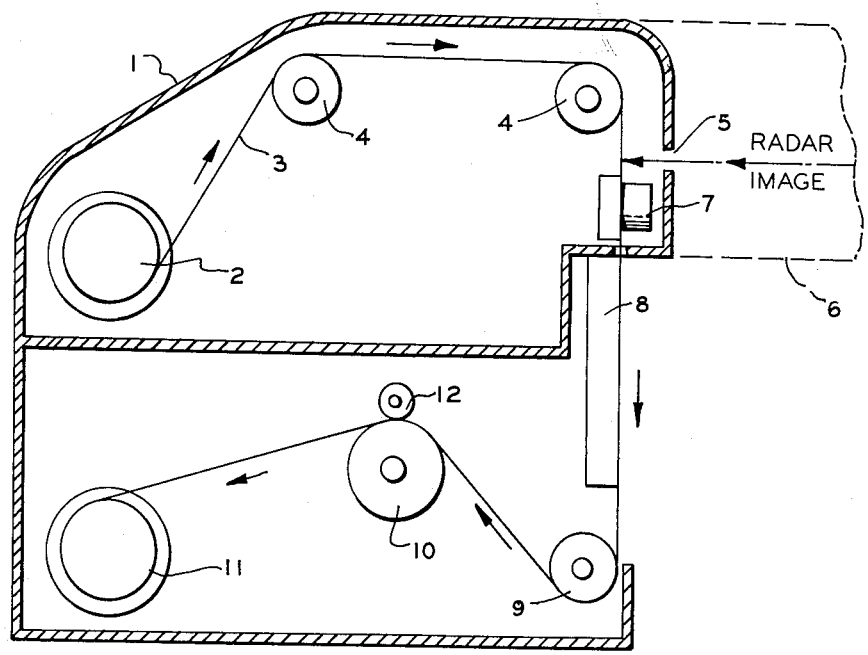
FIG. 1 is a view of a light-tight film magazine with the shell broken away to show the interior thereof.

Referring now to the drawings for a detailed description of this invention, and particularly to FIG. 1 which shows the photographic system involved, reference numeral 1 designates a light-tight film magazine in which a spindle is contained for rotatably supporting a film supply spool 2. Photographic film 3 is fed from said supply spool 2 in the direction of the arrows over idler rollers 4, and 4′, and past an aperture 5 through which the film receives an image from a camera body 6. The exposed film then passes through a rapid processing station 7 at which point it is developed by an "arrested" developing process so that the film may be passed over a backlighted viewing panel 8 for observation by an operator. The film then passes over another idler roller 9, over a metering roll 10 and is wound up on a takeup spool 11. A pinch roll 12 provides additional film tension. The metering roll 10 is driven by any suitable means, such as a gearhead motor (not shown) and is the prime mover of the film. The takeup spool 11 is driven by a torque motor (not shown) and winds up the film as it is metered out by metering roll 10.

Figures 2, 3:
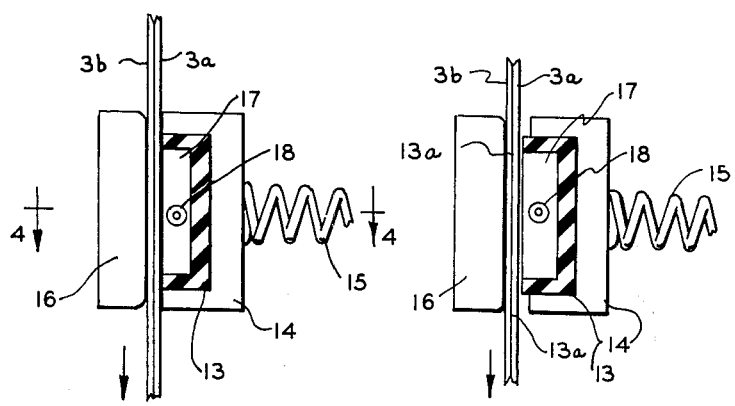
FIG. 2 is a vertical cross-sectional view of a processing fluid applicator in operative position.
FIG. 3 is a view of the applicator shown in FIG. 2 in a non-processing position.

Referring now to FIGS. 2–4 of the drawings, a preferred embodiment of a rapid processor for use with the instant invention is shown, consisting of a rubber applicator cup 13 mounted in a block 14. During processing, as shown in FIG. 2, the applicator cup 13 is held against the emulsion side 3a of the film 3 by the pressure of a number of springs 15. The film is restrained on the base side 3b of the film 3 by a fixed backing pad 16. The film 3 is pulled through the processing station by the metering roll 10 shown in FIG. 1, which exerts enough force to overcome the frictional drag between the lips 13a of the applicator cup 13, the film 3, and the fixed backing pad 16. It is important to note at this time that the applicator cup 13 and the emulsion side 3a of the film 3 form an enclosed chamber 17, when the equipment is in the processing position shown in FIG. 2, through which developer solution may be pumped to develop the film. Inlet and outlet ports are provided at opposite ends of the chamber 17 for the supply of developer solution. The outlet port is shown in FIGS. 2 and 3 at 18. When the equipment is in a non-processing position, such as shown in FIG. 3, the applicator cup 13 is removed from the film surface so that the applicator lips 13a are approximately 1/16 inch away from the film.

Starting with the enclosed chamber 17, a complete developer solution circulating system may be constructed with the components shown in FIG. 4. Flexible conduit means are connected at one end to the inlet port 20 of the enclosed chamber 17 and at the other end to the developer solution supply tank 21. A two-way valve 22 is inserted in the line between the inlet port 20 and the supply tank 21. Additional flexible conduit means 23 are connected at one end to the outlet port 18 of the enclosed chamber 17 and at the other end to the suction side of pump 24. A three-way valve 25 is inserted in this line between the outlet port 18 and the pump 24. The pump 24, which may be submerged in the developer solution, is driven by an externally-mounted motor 26, through a drive shaft 27. The developer solution in the supply tank 21 is maintained at the proper processing temperature by a heater 28 and a thermostat 29. With both valves 22 and 25 open, the pump 24 running, the developer solution is pulled from the supply tank 21, through the system in the direction of the arrows, and then discharged from the pump back into the supply tank. The film is moving in a direction normal to the plane of the paper in FIG. 4 and is being continuously processed.

The processing system described to this point is intended only to schematically illustrate the principle of an enclosed chamber formed by the film and the applicator cup and the possibility of circulating developer solution through it. The actual equipment is more elaborate, containing additional components which provide for the steps of putting the rapid processing equipment in a condition of readiness; putting the equipment into operation; starting and stopping the equipment under intermittent duty conditions; shutting down after completion of a run; and automatically returning the rapid processing facilities to a predetermined starting point in the event of an electrical failure to prevent loss of developer solution and damage to the film.

To accomplish these ends involves a series of actions which must be performed in a certain order, i.e., sequentially. Because of this, the instant invention is known as a sequencing unit.

Referring now to FIGS. 5, 6 and 7, which show in detail the principles of a preferred embodiment of this invention, and specifically to FIG. 5, the reference numeral 30 designates a fixed main support. The prime mover for the unit is a gearhead motor 31 mounted rigidly on the support 30. An electric clutch coupling 32 is composed of three main parts: the field 32a the rotor 32b and the armature 32c. The field 32a is rigidly fastened to the support 30. The rotor 32b is mounted on the output shaft 33 of the gearhead motor 31 and turns with it. The armature 32c is mounted on a jackshaft 34, in such a way that it is free to slide axially thereon, but is restrained from turning independently of it by the key 35. The jackshaft 34 is free to turn in the bushing 36, but cannot move axially because of the pin 37 which slides in a groove 38 in the jackshaft 34. When the clutch coupling 32 is electrically energized, the armature 32c is magnetically pulled toward, and clamped to, the rotor 32b. In the energized condition, the gearhead motor shaft 33, the rotor 32b, the armature 32c, the jackshaft 34 and a pinion 39, which is pinned on the jackshaft, move as a unit.

The pinion 39 meshes with a gear 40 which is pinned to a sequencing unit shaft 41 supported by bearings 42 in the main support 30. A cam 43 is fastened to the sequencing unit shaft 41 by the collar 44 and actuates a lever arm 45. FIG. 6 shows this cam action in another view. When the high point 43a of the cam 43 is in contact with the lever arm 45, the lever arm 45 pivots about the center of the stud 46, which is supported by the bearings 47 in the main support 30. The purpose of the cam action is to raise the applicator cup 13 shown in FIGS. 2-4 against the pressure of the springs 15. The applicator cup is not shown in FIG. 5 for the sake of clarity, but its relationship to the lever arm 45 can be seen in FIG. 6 where it is depicted in dot-dash lines. When the low point 43b on the cam 43 contacts the lever arm 45, the lever arm permits the springs 15 to press the applicator cup 13 against the film 3. FIGS. 2 and 3 show the film-contacting and raised positions, respectively.

According to an added feature of this invention, a torsion spring 48 circumscribes the sequencing unit shaft 41 and is restrained at one end by a pin 49, rigidly mounted in the main support 30. The other end of the torsion spring 48 is driven by a driving pin 50, mounted in a flange 51, integral with the sequencing unit shaft 41. An examination of FIGS. 5 and 7 shows that torsion spring 48 tends to turn the entire sequencing mechanism in a clockwise direction, but only to the point where the flange portion 51a encounters the positive stop means 52. FIG. 7 shows this mechanism in its furthermost clockwise position. This may be considered the starting point for the sequencing operation.

Fastened to the main support 30 by the nut 53 is a timing unit 54. The shaft 55 of the timing unit 54 turns with the sequencing unit shaft 41 since it is locked to it by the set-screw 56. Integral with the timing unit shaft 55 are the cams $a$, $b$, $c$, $d$ and $e$, which actuate their respective microswitches $a^1$, $b^1$, $c^1$, $d^1$ and $e^1$. The timing unit shaft 55 is a through shaft on which is one sprocket 57 of a chain and sprocket drive unit 58. The other sprocket 59 is fastened to a shaft 60 which drives the two disc valves, 22 and 25 of the circulating system shown in FIG. 4. The opening and closing of these valves depends upon the angular position of the shaft 60 (and, of course, the angular position of the entire sequencing mechanism).

The foregoing briefly describes the mechanical features of the sequencing unit. Before explaining its operation, it should be pointed out that certain other electrical components such as switches, relays, wiring, etc., are required. The functions of these components are conventional and contain no inventive features; therefore, no particular emphasis will be placed on them.

The sequencing unit, in conjunction with the electrical components, may be controlled entirely by a remotely located, three-position selector switch actuating means. For convenience, these three positions will be called "off," "standby" and "operate." In the "off" position, the sequencing unit is always at the same point in its cycle. This is the starting position, previously mentioned, and shown in FIG. 7. There is no power being supplied to the electrical components. The applicator is not in contact with the film (see FIG. 3). (Note: Unless otherwise stated, all reference from this point on will be to FIG. 5.) Since the electric clutch coupling 32 is de-energized, the torsion spring 48 keeps the sequencing mechanism against the positive stop means 52 and the sequencing mechanism is independent of the sequencing gearhead motor 31.

When the selector switch is turned to the "standby" position, the heater 28 in FIG. 4 is electrically energized to warm the developer solution to the operating temperature. At the same time, the clutch coupling 32 is energized and the sequencing mechanism is locked onto the output shaft 33 of the gearhead motor 31. In the "standby" position, the magazine and rapid processing equipment is in a state of readiness, requiring only that the selector switch be turned to "operate" to go automatically into operation.

When the selector switch is turned to "operate," the following action takes place sequentially:

(1) The sequencing gearhead motor 31 is energized and starts turning in a clockwise direction (as seen from view 7—7). Through the pinion and gear connection 39, 40 the sequencing units shaft 41 is driven in a counter-clockwise direction. The torque output of the motor 31 exceeds that of the torsion spring; therefore, it drives the sequencing mechanism and winds up the torsion spring to store energy.

(2) Cam "$a$" on the timing unit shaft 55 actuates microswitch $a^1$, which does the following:

(a) Energizes the metering roll motor to turn the metering roll 10, FIG. 1, and pull the film off the supply spool 2, FIG. 1.

(b) Energizes the takeup spool torque motor, which turns the takeup spool 11, FIG. 1, and winds up the film from the metering roll. The film is now in continuous motion, capable of accepting a radar image.

(3) Cam "$b$" on the timing unit shaft 55 actuates microswitch $b^1$, which trips a relay to electrically put the motor in a condition of readiness to go in reverse (counter-clockwise) on the return part of the cycle.

(4) The cam 43 actuates the lever arm 45, to permit the applicator cup 13, FIG. 2, to come into contact with the film, forming the enclosed chamber 17 and circulatory system previously mentioned.

(5) Cam "c" on the timing unit shaft 55 actuates microswitch $c^1$ and starts the pump motor 26, FIG. 4, which turns the pump 24, FIG. 4.

(6) Valve 25 on the suction side of the pump, which is normally closed at the starting point, opens to create a partial vacuum in the enclosed chamber 17.

(7) Valve 22, which is normally closed at the starting point, opens. Developer solution is now permitted to flow from the developer solution supply tank 21, FIG. 4, through the enclosed chamber 17 of the applicator cup 13 to process the film, and is then discharged from the pump 24 back into the supply tank 21.

(8) Cam "d" on the timing unit shaft 55 actuates microswitch $d^1$ and stops the sequencing motor 31 and all further sequencing action. All the motion described has taken place in something less than 360° rotation of the sequencing mechanism.

(9) The equipment is now in full operation and will continue to be so unless:

(a) The selector switch is turned back to standby."

(b) A power failure occurs.

To stop the equipment and return it to a condition of readiness, it is only necessary to turn the selector switch to its "standby" position. When this is done, the following action takes place sequentially:

(1) The sequencing gearhead motor 31 is energized to turn the sequencing mechanism in reverse, i.e., counter-clockwise, opposite to the direction it turns during "operate."

(2) Valve 22 shuts off the solution supply, vents to the atmosphere to permit clearing the lines and enclosed chamber 17 of the applicator cup 13 of developer solution and then shuts off.

(3) Valve 25 closes.

(4) Cam "c" actuates microswitch $c^1$ to shut off the pump motor 26 and stop the pump 24 (FIG. 4).

(5) Cam 43 actuates the lever arm 45 and raises the applicator cup 13. It is necessary to do this each time the film is to be stopped to prevent the film emulsion 3a from adhering to the rubber applicator cup 13, which would cause rubber deterioration.

(6) Cam "b" actuates microswitch $b^1$ to put the sequencing motor 31 in a condition of readiness to go forward (clockwise).

(7) Cam "a" actuates microswitch $a^1$ to stop the metering roll 10 and take up spool 11. The film 3 is now stopped.

(8) Cam "e" actuates microswitch $e^1$ to stop sequencing motor 31 at some point short of the positive stop 52, in FIG. 7. If the selector switch is now turned to "off," the electric clutch coupling 32 would be de-energized and the torsion spring 48 would then move the sequencing mechanism back against the positive stop 52, to its normal starting position (FIG. 7).

Note that during the "operate" part of the cycle, the torsion spring 48 is being wound up to store energy. If there should be a power failure at any point in the cycle and the electric clutch coupling is de-energized, the torsion spring will return the sequencing mechanism to its "off" position. This means the valves will be closed to prevent loss of solution, and the applicator cup will be raised off the film to prevent damage to either the applicator lips or the film itself. This is an additional novel feature of the invention; i.e., during normal operation, it is designed to run electrically, but it is always capable of returning automatically to its starting point, even if there is a complete power failure.

The present invention may be embodied in other specific forms without departing from the spirit of the invention.

What is claimed is:

1. In photographic apparatus, wherein photographic film is withdrawn continuously from a supply spool by a metering roll and is sequentially fed past an exposure station, a rapid processing station, and a viewing station, in rapid succession, the improvement which comprises a power driven sequencing unit operable from an initial starting point for automatically actuating said metering roll to withdraw film from said supply spool and feed it serially, and continuously, through the respective stations, means on said sequencing unit for contacting said film with developer solution at said rapid processing station, and means for automatically returning said sequencing unit to its initial starting point on failure of driving power.

2. In photographic apparatus of the type wherein photographic film is withdrawn from a supply by a metering roll and is fed in sequence past an exposure station, a rapid processing station; and a viewing station, the improvement which comprises, in combination, a sequencing unit for automatically actuating said metering roll to feed said film serially and continuously through said stations, and means for contacting said film with developer solution which comprises an applicator cup, pivotally mounted for movement to and from the surface of said film, said applicator cup, in said film-contacting position and said film surface, forming a liquid-tight enclosed chamber, a plurality of springs normally maintaining said applicator cup in contact with said film surface, a mechanism for pivoting said applicator cup to and from said film surface, inlet and outlet ports in said applicator cup for introduction and withdrawal of a developer solution to said enclosed chamber when said applicator cup is in said film-contacting position, a developer solution supply tank containing developer solution and a pump submerged in said developer solution for delivering said solution to said enclosed chamber through said inlet port, and returning the excess thereof to said supply tank through said outlet port.

3. Apparatus in accordance with claim 2, wherein said mechanism for pivoting said applicator cup to and from said film surface comprises a support, a motor fixed to said support, a lever arm pivotally mounted on a stud, said lever arm supporting said applicator cup on one end thereof, and a cam having a high point and a low point, said cam being in contact with the end of said lever arm remote from said applicator cup, said cam being rotatably driven by said motor so that when said high point of said cam is in contact with said lever arm, the applicator cup is raised from said film-contacting position and when said low point of said cam is in contact with said lever arm, the applicator cup is returned to said film-contacting position by said plurality of springs.

4. In apparatus for the rapid processing of photographic film, a sequencing unit comprising, in combination, a support, a motor rigidly fixed to said support, a motor output shaft extending axially from said motor and driven thereby, a jackshaft axially aligned with said motor output shaft, but spaced therefrom, means for electrically fastening said motor output shaft to said jackshaft for simultaneous rotation, a pinion fixed to said jackshaft, a gear intermeshing with said pinion, a sequencing shaft fixed to, and driven by, said gear, a cam fixed to said sequencing shaft, a lever arm in contact with said cam at one end of said arm, said lever arm pivotally mounted in said support, an applicator cup adapted to provide developer solution to said photographic film for processing thereof, said applicator cup supported by the end of said lever arm remote from said cam, and a timing unit driven by said sequencing shaft.

5. Apparatus in accordance with claim 4 wherein said means for electrically fixing said motor shaft and said jackshaft for simultaneous rotation comprises an electric clutch, said clutch consisting of a field, a rotor and an armature, the field of said clutch being fixed to said support, the rotor of said clutch being rigidly mounted on said motor shaft for rotation therewith, the armature of said clutch being mounted on said jackshaft, said armature of said clutch being free to slide axially on said jackshaft, but restrained from turning, independently thereof, said armature being magnetically pulled toward and clamped to said rotor when said electric clutch is energized.

6. Apparatus in accordance with claim 4 wherein said timing unit comprises a timing unit shaft fixed for rotation with said sequencing shaft, a plurality of cams fixed to said timing unit shaft and a plurality of microswitches initiated by said plurality of cams.

7. Apparatus in accordance with claim 4, further comprising a torsion spring circumscribing said sequencing shaft, one end of said torsion spring being fixed to said support, the other end of said torsion spring being driven by said sequencing shaft to coil said torsion spring and thereby store energy and, in the event of electric power failure, said torsion spring acting to return the sequencing shaft and thereby the timing unit shaft, to a predetermined starting position.

References Cited by the Examiner
UNITED STATES PATENTS

| | | | |
|---|---|---|---|
| 2,856,829 | 10/58 | Orlando | 95—14 |
| 2,930,302 | 3/60 | Tuttle | 95—14 |
| 2,961,938 | 11/60 | Townley | 95—14 X |
| 2,972,741 | 2/61 | Hammond | 95—12 X |
| 3,081,687 | 3/63 | Takats | 95—14 X |
| 3,097,580 | 7/63 | Kalthoff | 95—14 X |

EVON C. BLUNK, *Primary Examiner.*